W. E. SHARP.
REFRIGERATOR CAR.
APPLICATION FILED APR. 29, 1909.
1,116,937.
Patented Nov. 10, 1914.
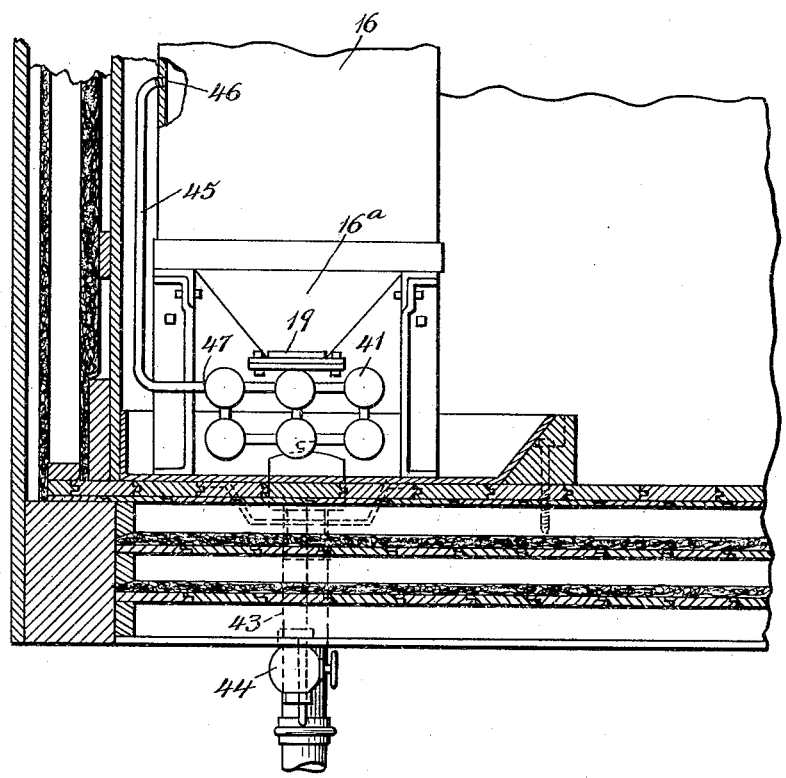

UNITED STATES PATENT OFFICE.

WILLIAM E. SHARP, OF CHICAGO, ILLINOIS, ASSIGNOR OF ONE-HALF TO GEORGE B. ROBBINS, OF HINSDALE, ILLINOIS.

REFRIGERATOR-CAR.

1,116,937.     Specification of Letters Patent.     Patented Nov. 10, 1914.

Application filed April 29, 1909. Serial No. 492,983.

*To all whom it may concern:*

Be it known that I, WILLIAM E. SHARP, a citizen of the United States, residing at Chicago, in the county of Cook and State of Illinois, have invented certain new and useful Improvements in Refrigerator-Cars, of which the following is a specification.

This invention relates to refrigerator cars, and has reference more especially to means for controlling the disposal of the brine accumulating in the usual ice and brine tanks carried by such cars.

The damage done by salt water dripping from refrigerator cars and coming in contact with the steel rails, bridges, cattle guards, etc., has reached such proporations that the railroads have issued a prohibition against this practice, and thus made it necessary to provide some means of controlling and disposing of the brine in a manner to avoid injury to tracks and track equipment.

The object of the present invention is to provide means of control such that the brine may be carried and disposed of at such times and places as may be designated.

In its broadest aspect the invention contemplates the equipment of the ice and brine tank or tanks with a valve or valves which will remain closed during the run, but which may be readily opened at icing stations or other designated points to permit of the drawing off of the accumulated brine.

My invention further contemplates the provision of means whereby a portion of the brine accumulating during the run between such stations or points may be drawn off from the ice and brine tank or tanks so as to avoid a diminution of the refrigerating efficiency of said tank or tanks, and be stored in condition for subsequent discharge. Such brine storage receptacle may be carried beneath the car; or, where the construction of car and tanks will permit, it may be carried within the car so as to add its own refrigerating effect to that of the ice and brine tank or tanks.

In the accompanying drawing I have illustrated a practical embodiment of the invention as applied to one form of ice and brine tanks; and referring thereto, the figure is a fragmentary vertical section through the lower portion of the car end, wherein a brine reservoir adapted to carry the surplus brine is located within the car directly beneath the ice and brine tank, and is provided with an automatic overflow from the ice and brine tank.

If the brine is drawn off from the ice and brine tanks between stations without provision for storing the brine, there is, of course, a considerable loss of refrigerating efficiency; and the sacrifice of this efficiency may be avoided where the interior construction and arrangement of the car will permit it, by locating a brine storage tank or reservoir within the car. Such an arrangement is illustrated in the drawing, wherein a brine reservoir in the form of a cooling coil or battery of connected pipes is indicated at 41 directly beneath and communicating with the conical bottom $16^a$ of the ice and brine tank 16; an ordinary slide-valve 19 controlling such communication, and the brine reservoir being provided with a discharge pipe 43 extending through the floor of the car and equipped at its lower end with an ordinary delivery cock or faucet 44. In this connection I have also shown a means for automatically draining the ice and brine tank into the brine reservoir; the same comprising an over-flow pipe 45 that communicates freely at its upper end with the tank 16, as shown at 46, and at its lower end with the reservoir 41, as shown at 47. The pipe 45 will, in practice, communicate with the tank 16 at such a height thereon as corresponds to the level at which the brine accumulating in said tank reaches an objectionable amount relatively to the refrigerating efficiency of the tank. By this means the excess of brine in the ice and brine tank or tanks is automatically drained off, but a considerable refrigerating efficiency which such brine possesses is utilized through its storage in the reservoir or cooling coil 41, until the next icing station is reached.

From the foregoing it will be evident that my invention provides a simple and efficient means for preventing the injury to railway tracks and track accessories which has heretofore resulted from the unchecked dripping and draining of salt water from the ice and brine tanks; provides a means for quickly discharging the accumulated brine when an icing station or other draining point has been reached; and, further, provides a means whereby the aforesaid objects may be attained without any substantial impairment of the refrigerating efficiency of the ice and brine tanks in transit.

It will be manifest to those skilled in the art that the principle of the invention and the useful results flowing therefrom may be embodied in and secured by other forms of the invention than those herein illustrated and described. Hence, it should be understood that the invention is not limited to the particular apparatus disclosed, except to the extent clearly indicated in specific claims.

I claim:

1. In a refrigerator car, the combination of an ice and brine tank having a discharge opening above the bottom of said tank and adapted automatically to prevent an excessive accumulation of brine in said tank, a reservoir coil for receiving brine from said tank through said opening, and also through a discharge opening in the bottom of said tank, an outlet pipe for said reservoir coil, and a valve in said outlet pipe, substantially as described.

2. In a refrigerator car, the combination of an ice and brine tank, a brine reservoir for receiving brine from said tank, a valve between said reservoir and said tank, a pipe connecting said tank with said brine reservoir, whereby the brine in said tank will be maintained at a constant level, an outlet pipe for said reservoir, and a valve in said outlet pipe, substantially as described.

3. In a refrigerator car, the combination of an ice and brine tank, an auxiliary refrigerating receptacle, means for automatically discharging an excess portion of the brine in said tank into said auxiliary receptacle, hand controlled means for emptying all of the briny contents of said tank into said receptacle, and hand controlled means for discharging the contents of said auxiliary receptacle, substantially as described.

WILLIAM E. SHARP.

Witnesses:
 Robt. W. Allen,
 B. F. O'Connor.

---

Copies of this patent may be obtained for five cents each, by addressing the "Commissioner of Patents, Washington, D. C."